3,705,866
AQUEOUS COATING COMPOSITIONS
Minoru Shibata and Makoto Yusa, Hiratsuka-shi, and Hisao Nakata and Michisuke Harada, Nigata-ken, Japan, assignors to Kansai Paint Company Limited, Amagasaki-shi, Hyogo-ken, and Nippon Soda Company Limited, Tokyo-to, Japan
No Drawing. Filed Dec. 3, 1969, Ser. No. 881,859
Claims priority, application Japan, Dec. 9, 1968, 43/90,336
Int. Cl. C09d 3/00
U.S. Cl. 260—23.7 A          15 Claims

ABSTRACT OF THE DISCLOSURE

An aqueous coating composition contains as a binder a saponified product of a modified diene polymer which is a condensation product of a pyridine acid value of 30 to 200 of a hydroxyl terminated polymer of an aliphatic conjugated diene of 4 to 8 carbon atoms and at least one of polybasic acids or anhydrides thereof having 8 to 26 carbon atoms in the carbon-carbon skeletal chain thereof.

---

This invention relates to a new aqueous coating composition useful as varnish and paint, particularly as electrophoretic coating paint.

Many kinds of aqueous coating compositions have been proposed and widely used, as they are not only economical but also have no inflammability and no toxicity, unlike organic solvent-using varnishes or paints. However, there are no aqueous coating compositions which are satisfactory in various properties required in combination for varnishes or paints. For example, the conventional aqueous paints are poor in or lack at least one of the requisite properties such as dispersibility in water, stability for storage, pigment dispersibility and the like which are essential to varnish or paint itself, and further the film obtained from such aqueous paints are not always excellent in the properties such as water-proof property, anticorrosive property, impact adhesive property, adhesive property, etc.

In addition aqueous paints to be used for electrophoretic deposition must fulfill still severer requirements of properties, so that none of the aqueous paints so far proposed have proved satisfactory in this respect.

One object of the invention is accordingly to provide an aqueous coating composition which is excellent in various properties required for varnish or paint itself, such as dispersibility in water, stability for storage and pigment dispersibility.

Another object of the invention is to provide an aqueous coating composition from which a coating film having excellent water-proof, anticorrosive, impact adhesive and adhesive properties can be obtained.

A further object of the invention is to provide an aqueous coating composition for electrophoretic deposition coating which is satisfactory in all properties strictly required for such purposes, particularly in, for example, stability during operation, electrodeposition characteristics and properties of the deposited film obtained therefrom.

These and other objects of the invention will be apparent from the following description.

According to the research of the present inventors it has been found that an aqueous coating composition containing specific modified diene polymer as a binder is excellent in dispersibility in water, storage stability and pigment dispersibility and that the coating film obtained from such composition has good appearance and displays excellent physical and chemical properties. It has also been found out that when such composition is used for electrophoretic coating paint it is stable under electrodeposition operation for a longer period of time and displays excellent electrodeposition characteristics to give deposited film excellent in chemical and physical properties. Particularly, it is to be noted that the present coating composition has far more excellent pigment dispersibility and can produce coating film having better flexibility as compared with the conventional aqueous varnishes or paints.

The specific modified diene polymer used in the invention is a saponified product of a condensation product having a pyridine acid value of 30 to 200 of
(a) A hydroxyl terminated polymer of an aliphatic conjugated diene having 4 to 8 carbon atoms, said hydroxyl terminated polymer having at least one hydroxyl group at the end of the polymeric chain and a number average molecular weight of 200 to 10,000 and
(b) At least one of polybasic acids or anhydrides thereof having 8 to 26 carbon atoms in the carbon-carbon skeletal chain thereof.

In the invention the hydroxyl terminated diene polymer is derived from a polymer of diene having a conjugated double bond and 4 to 8 carbon atoms. Preferable examples of the conjugated diene are butadiene methyl butadiene and chlorobutadiene. The conjugated diene polymers include homopolymers of conjugated dienes, derivatives of the homopolymers, and copolymers of conjugated dienes and other vinyl monomers. The homopolymers of conjugated dienes are 1,2-addition conjugated diene homopolymers, 1,4-addition conjugated diene homopolymers and 1,2- and 1,4-random addition conjugated diene homopolymers. The derivatives of the homopolymers are, for example, partially hydrogenated or partially halogenated products thereof. The copolymers of conjugated dienes are those comprising not less than 50 weight percent of conjugated diene and not more than 50 weight percent of other vinyl monomers, such as styrene, methyl methacrylate, acrylonitrile etc. In the invention the hydroxyl terminated diene polymer having a number average molecular weight of 200 to 10,000 is used. Preferable molecular weight thereof is in the range of 800 to 5,000. The most preferable hydroxyl terminated diene polymer is hydroxyl terminated butadiene homopolymer.

The hydroxyl terminated diene polymers are known in the art and prepared by conventional polymerization methods, such as radical polymerization and ionic polymerization, followed by hydroxylation of the resultant polymer. The most desirable polymerization method is living polymerization, since the polymer of more than 9% of 1,2-addition content can be obtained by this method with such a narrow range of distribution of molecular weight as the ratio of weight average molecular weight to number average molecular weight being less than 2.0, making it possible not only to improve the drying property of a coated film but also to keep a bath composition constant in continuous electrophoretic coating operation for a long period of time. The living polymerization method of conjugated dienes and alkylation of the resultant polymer are known in the art and described, for example, in Japanese patent publications Nos. 7,051 of 1965 and 17,485 of 1967. According to the living polymerization, for instance, one or more species of conjugated diene or a mixture of conjugated diene and other vinyl monomer is polymerized in an organic solvent in the presence of an initiator. Employable as the initiator are, for example, (1) alkalimetals, such as lithium, sodium, potassium, rubidium or cesium; (2) alkyl-, aryl- or arylalkyl-alkali metal compounds, such as n-butyl lithium, phenyl lithium, benzyl sodium or cumyl potassium; (3) conjugated diene oligomer-dialkali metal addition products, such as α-methylstyrene dimer-dilithium, α-methylstyrene tetramer-disodium or butadiene dimer-disodium, (4) alkali metal ketyls, such as benzophenone-potassium addition product; or (5) aromatic hydrocarbon-alkali metal addition products, such as naphthaline-lithium, anthracene-sodium, biphenyl-potassium. The examples of the organic solvents used are Lewis base, such as tetrahydrofuran, 1,2-dimethoxyethane, dimethyl ether, trimethyl amine, etc., or hydrocarbons, such as n-hexane, cyclohexane, toluene, benzene, etc. The hydroxylation of the resultant conjugated diene polymer can be carried out, for example, by reacting it with oxygen, formaldehyde or ethylene oxide and hydrolysing the resultant product.

While the hydroxyl terminated diene polymers, when used as a binder for coating composition as it is, have a property to give a coating film of poor flexibility, the present modified polymer obtained by esterification of the hydroxyl terminated diene polymer with a certain polybasic acid can produce a coating film excellent in flexibility.

The polybasic acids and anhydrides thereof used in the invention are those having 8 to 26 carbon atoms in the carbon-carbon skeletal chain and include, for example, addition products of $\alpha,\beta$-ethylenically unsaturated dibasic acids or anhydrides thereof with vegetable oil fatty acids or with esters thereof, alkenyl derivatives of $\alpha,\beta$-ethylenically unsaturated dibasic acids or of anhydrides thereof, preferable being addition products of $\alpha,\beta$-ethylenically unsaturated dibasic acids or anhydrides thereof with vegetable oil fatty acids. The representative examples are maleic vegetable oil fatty acids, maleic vegetable oil, fumaric vegetable oil fatty acids, fumaric vegetable oil, dodecenyl succinic acid anhydride, nonenyl succinic acid anhydride, etc. Preferable polybasic acids are those having 10 to 23 carbon atoms in the carbon-carbon skeletal chain, and particulrly maleic vegetable oil fatty acids and fumaric vegetable oil fatty acids are preferably used in the invention.

The polybasic acids or anhydrides thereof may be used alone or in admixture with one another in the range of 0.5 to 1.5 equivalent, preferably 0.8 to 1.2 equivalent, per hydroxyl group of the hydroxyl terminated diene polymer used. The reaction of the polymer and polybasic acids may be conducted at elevated temperatures. The reaction temperature may vary over a wide range in accordance with the kind of polybasic acid or anhydride used, but it is usually in the range of 70 to 250° C. Preferable reaction temperature in using polybasic acid is in the order of 120 to 250° C., while that in anhydride is in the order of 70 to 180° C. In either case, when the reaction temperature is higher than 150° C. undesired gelation tends to occur, so that it is preferable to use antioxidants which serve to prevent such gelation. Examples of the antioxidants are 4-methyl-2,6-di-t-butylphenol, 2,4-dihydroxybenzophenone, hydroxyphenylbenzotriazole, ethyl mercaptane, butyl mercaptane, hydroquinone, benzoquinone. The antioxidant may be added in the range of 0.01 to 1.5 weight percent, based on the total weight of the reaction mixture. The reaction may preferably be conducted in an inert gas atmosphere, such as nitrogen gas. For the purpose of adjusting the reaction velocity solvents and/or catalysts may be added to the system, as required. In using polybasic acids toluene, xylene or like inert solvents and/or sodium carbonate, tertiary amines or like catalysts conventional for esterification reaction may be used, while in using anhydride of polybasic acids methyl-2-methyl-2-methoxypropyl ketone, t-butanol and like inert solvents may be used.

As the condensation reaction proceeds the viscosity of the reaction mixture progressively increases, and it is preferable to continue the reaction until the viscosity of the resultant reaction mixture dissolved in butylcellosolve in 50 weight concentration reaches 3.0 to 30 stokes at 25° C. In any case the resultant condensation product should have a pyridine acid value ranging from 30 to 200. If the acid value thereof is less than 30 it becomes difficult to disperse the resultant product in water with saponification, while if it is higher than 200 the electrophoretic deposition characteristics of the paint prepared therefrom is impaired and further physical properties of the coating film obtained therefrom are deteriorated. Preferable pyridine acid value is in the range of 50 to 150, the pyridine acid value used in the specification and claims being determined by the following method:

0.3 g. of a sample resin is placed in a 100 ml. triangular flask, to which 40 ml. of 50 weight percent aqueous solution of pyridine is added and heated at the boiling point for 2 min., then cooled to room temperature, and pyridine acid value (KOH mg./resin 1 g.) is determined by titrating 0.1-N alcohol solution of potassium hydroxide using phenolphthalein.

The polybasic acids or anhydrides thereof may be used in combination with lower molecular weight polybasic acid or anhydride thereof to improve the dispersibility in water of the resultant product. Examples of the lower molecular weight polybasic acid or anhydride are phthalic anhydride, maleic anhydride, tetrahydrophthalic anhydride, hexahydrophthalic anhydride, trimellitic acid anhydride, 5-bicyclo-[2,2,1]-heptene-2,3-dicarboxylic acid or anhydride thereof, etc. However, in such case the lower molecular weight polybasic acids should be used in less proportion in terms of carboxyl group ratio relative to the higher molecular weight dibasic acid used in the invention, as using larger amount of lower molecular weight polybasic acid results in poor pigment dispersibility and the production of a coating film of deteriorated properties.

When polybasic acid anhydride is used for the condensation reaction, acid anhydride radical may remain in the product due to the use of excess amount or incomplete reaction. Such anhydride radical remaining in the product does not affect adversely on the paint prepared from the resultant product as well as on the film obtained from the paint, but it is advisable to modify the anhydride radical with compounds having active hydrogen atom, such as monohydric alcohols, primary or secondary amines, ammonia, water, etc. in order to impart useful properties to the products, as required.

(1) Half esterification with monohydric alcohols

By this treatment stability for storage and pigment dispersibility of the coating composition obtained therefrom are improved and electrodeposition coating operation becomes easier. Further the flexibility of film obtained from the composition may also be improved.

As the monohydric alcohol which can be used may be included aliphatic monohydric alcohols of 1 to 4 carbon atoms, alkyleneglycol monoalkyl ($C_1$–$C_8$) ether, etc. The alcohol may be added to the condensation product in the amount of at least 0.5 equivalent per acid anhydride radical in the condensation product and the mixture is reacted at 60 to 150° C. until the difference between pyridine acid value and alcohol acid value of the resultant product reaches less than 15, the alcohol acid value being measured in the manner illustrated in relation to the appended examples. This reaction is shown by the following equation:

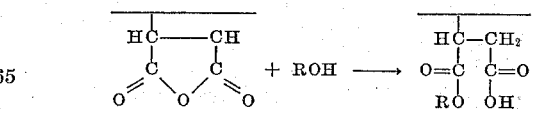

(2) Amide formation with amines or ammonia

By this treatment electrophoretic deposition characteristics are improved.

As the amine can be used primary and secondary amines, such as mono- or di-ethylamine, mono- or di-ethanol amine, mono- or di-propyl amine, mono- or di-butyl amine, mono- or di-propanol amine, etc. The amine or ammonia may be added to the condensation product in 0.8 to 1.2 equivalent per acid anhydride radical in the condensation product and the mixture is reacted at 100 to 160° C. until the difference between pyridine acid value and alcohol acid value of the resultant product reaches less than 15. This reaction is shown by the following equation:

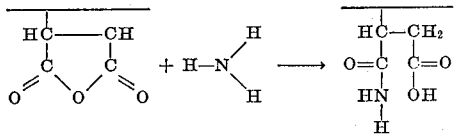

(3) Ring cleavage with water

By this treatment water dispersibility is improved. Water is used in the amount of at least 0.8 equivalent per mole of acid anhydride radical in the condensation product. According to this treatment the water and condensation product is reacted in the presence of tertiary amine at 30 to 100° C. until the difference between pyridine acid value and alcohol acid value becomes less than 15. The tertiary amine is used in at least catalytic amount, though a far larger amount thereof may be used.

This reaction is shown by the following equation:

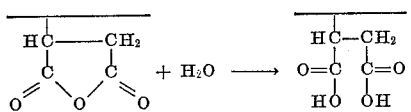

In the case where any treatment above is carried out, the pyridine acid value of the product should be in the range of 30 to 200, because lower or higher acid values result in the same drawbacks as mentioned before. The above three treatments with compounds having active hydrogen atom may also be carried out in combination.

The resultant condenstion product is then saponified with a base and dispersed in water. As the base can be used, for example, inorganic alkalis, such as ammonia, sodium hydroxide, potassium hydroxide, etc. and various organic amines, such as monomethylamine, diethyldiorganic amines, triethylamine, trimethylamine and like alkyl amines, monoethanol amine, diethanol amine, triethanol amine, diisopropanol amine, dimethylamino ethanol, diethylamino ethanol, monopropanol amine, butanol amine and like alkanol amines.

The base may be used in the amount of 0.3 to 1.5, preferably 0.5 to 1.0 equivalent amount to the acid value of the condensation product. In general this procedure is carried out by adding the base with water to the condensation product, whereby the present composition of varnish type containing the saponified product of the condensation product of hydroxyl terminated diene polymer and polybasic acid dispersed in water can be obtained. In this case water soluble solvents may be used with the base in the amount not higher than 50 weight percent, based on the weight of the condensaiton product. Examples of such solvents are n-butanol, isopropanol, benzylalcohol, diacetone alcohol, ethylene glycol monoalkyl ($C_1$–$C_4$) ether, methyl-2-methyl-2-methoxypropyl ketone, etc.

The aqueous composition of varnish type thus obtained may contain the resin binder, i.e., saponified product of the condensation product of hydroxyl terminated diene polymer and polybasic acid in the range of 20 to 70 weight percent and has a pH value of 6.5 to 9.5, preferably 7.0 to 8.5, but it can be diluted with water to the desired extent, as required. This composition is very stable and can be used for immersion painting, spray painting, electrophotoretic deposition coating, etc., as it is or after pigmented with pigments. As the pigments can be used those conventionally used in aqueous paint, for example, titan white, red iron oxide, cadmium yellow, lithopone, carbon black, graphite, chromium oxide, benzidine yellow, permanent yellow, toluizine red, phthalocyanine green, barium sulfate, calcium carbonate, clay, talc, silica, aluminium powder, etc. The pigment may be added to the composition in a wide range of 3 to 200 weight parts based on 100 weight parts of the resin binder. There may be also added various additives, such as anticorrosive agent, dispersing agent for pigments, antisetting agent, antifoaming agent, etc. to impart desired properties to the resultant composition. As the anticorrosive agents may be preferably used chromate anticorrosive agents such as strontium chromate, basic lead chromate, chromic acid, ammonium bichromate, potassium bichromate, etc. The anticorrosive agent may be added in the range of 0.3 to 10 weight parts based on 100 weight parts of the binder resin.

The present composition can be used, as required, in combination with other known resinous binders, such as hexamethoxymethylmelamine, partially butylether of methoxymethylmelamine, methoxymethyl urea, water-dispersible phenol resin, water-dispersible epoxyester resin, water-dispersible acryl resin, etc.

For better understanding of the invention examples are given below, in which all parts are by weight unless otherwise specified. The physical properties in examples were measured by the following methods:

(a) Alcohol acid value.—0.3 g. of a sample resin was placed in a 100 ml. triangular flask, to which was added 40 ml. of a 1:2 weight ratio mixture of toluene and 99 weight percent unmodified ethyl alcohol and heated to 80° C. to dissolve the resin in the mixture. The solution was thereafter cooled immediately to room temperature and alcohol acid value (KOH mg./resin 1 g.) was determined by titrating 0.1-N alcohol solution of potassium hydroxide, using phenolphthalein.

(b) Viscosity of resin.—Sample resin was dissolved in the same amount by weight of butyl Cellosolve to prepare a 50 weight percent solution and the viscosity was measured at 25° C. using Gardner-Holt bubble viscometer.

(c) Viscosity of varnish.—Sample varnish was maintained at 20° C. and the viscosity was measured with Brookfield viscometer at 10 r.p.m.

(d) pH.—After adjusting the solid concentration to 10 weight percent the pH of the sample was measured at 20° C. by using a glass electrode pH measuring device.

EXAMPLE 1

Maleinization of linseed oil

In a flask equipped with a stirrer, thermometer and reflux condenser were placed 878 parts of linseed oil and 196 parts of maleic anhydride. The resultant mixture was heated to 200° C. in about 1 hour and maintained at the temperature for 4 hours, whereby maleic linseed oil having pyridine acid value of 175 and alcohol acid value of 105 was obtained in a brown oily form.

Preparation of hydroxy terminated butadiene polymer by living polymerization 2.5 parts of metallic sodium was dispersed in 400 parts of tetrahydrofuran and the dispersion was cooled to −75° C. To the dispersion 110 parts of cooled butadiene was added slowly at −75° C. in 3 hours for polymerization. Then 6.5 parts of ethylene oxide was added dropwise with stirring to the resultant reaction mixture while raising the temperature of the system to room temperature. Then 200 parts of water was added with stirring to the mixture at room temperature and left to stand for 0.5 hour. The sodium hydroxide produced was separated from the lower layer and removal of tetrahydrofuran and unreacted ethylene oxide gave hydroxyl terminated butadiene polymer having the following characteristics:

| | |
|---|---|
| Number average molecular weight ($M_n$) | 2010 |
| Ratio of $M_w$ to $M_n$ | [1] 1.12 |
| Hydroxyl value | 47 |
| Content of 1,2-bond _____percent | 92.5 |
| Content of 1,4-trans bond _____do | 7.5 |

[1] $M_w$: weight average molecular weight.

Then in a flask equipped with a stirrer, thermometer, reflux condenser and gas injection pipe were placed 200 parts of the hydroxyl terminated butadiene polymer obtained as above, 215 parts of the maleic linseed oil obtained as above and 40 parts of t-butanol, and the air in the flask was replaced with nitrogen gas. The mixture was heated to 110° C. and maintained at the temperature until the viscosity of the mixture reached 6 to 6.5 stokes, whereby condensation product having pyridine acid value of 86 and alcohol acid value of 54 was obtained.

To the product cooled to 90° C. were added 8 parts of water and 0.4 part of triethylamine and the mixture was maintained at 90° C. for 1 hour with stirring for ring cleavage of residual acid anhydride radical, whereby resin of pyridine acid value of 86 and alcohol acid value of 80 was obtained.

In 20 parts of butyl Cellosolve was dissolved 100 parts of the resin thus obtained and the solution was dispersed in water by adding diethanolamine in 0.7 equivalent amount to the pyridine acid value of the resin, whereby varnish having solid concentration of 35 weight percent, varnish viscosity of 15 poise and pH value of 7.8 was obtained.

EXAMPLE 2

In the same flask as in Example 1 were placed 200 parts of hydroxyl terminated butadiene polymer prepared in the same manner as in Example 1 and 322 parts of maleic linseed oil obtained in the same manner as in Example 1 and the mixture was heated at 90° C. in nitrogen gas stream until the viscosity of the mixture reached 5.5–6.0 stokes, whereby condensation product of pyridine acid value of 103 and alcohol acid value of 64 was obtained.

To the product cooled to 60° C. was added 3.7 parts of diethylamine and the mixture was maintained at 60° C. for 2 hours for amide formation, after which 13 parts of water and 0.52 part of triethylamine were added and heated at 80° C. for 1 hour for ring cleavage of residual acid anhydride radical to produce resin having pyridine acid value of 98 and alcohol acid value of 91. 100 parts of the resultant resin was dissolved in 10 parts of butyl Cellosolve and the solution was dispersed in water by adding triethylamine in 0.6 equivalent amount to the pyridine acid value of the resin, whereby varnish having solid concentration of 35 weight percent, varnish viscosity of 15 poise and pH value of 7.7 was obtained.

EXAMPLE 3

280 parts of linseed oil fatty acid and 98 parts of maleic anhydride were mixed and heated at 200° C. for 4 hours to obtain maleic linseed oil fatty acid having pyridine acid value of 365 and alcohol acid value of 275 in a brown pasty form.

1070 parts of maleic linseed oil obtained in the same manner as in Example 1 and 38 parts of n-butanol were homogeneously mixed at 40° C. and heated at 110° C. for 2 hours, whereby 1100 parts of butoxy maleic linseed oil having pyridine acid value of 175 and alcohol acid value of 105 was obtained.

In the same flask as in Example 1 were placed 38 parts of the maleic linseed oil fatty acid obtained above, 110 parts of the butoxy maleic linseed oil obtained above and 110 parts of partly hydrogenated product (hydrogenation of 30%) of hydroxyl terminated butadiene polymer having the following characteristics:

Number average molecular weight ($M_n$) -------- 1100
$M_w/M_n$ ---------------------------------- 1.09
Hydroxyl value ------------------------------ 87
Content of 1,2-bond ------------------percent-- 91.6
Content of 1,4-trans bond ---------------do---- 8.4

The resultant mixture was heated in a nitrogen gas stream at 110° C. until the viscosity of the mixture reached 5–5.5 stokes, whereby condensation product of pyridine acid value of 98 and alcohol acid value of 89 was obtained. To the resultant product cooled to 90° C. were added 3 parts of water and 0.5 part of triethylamine and the mixture was maintained at 90° C. for 1 hour for ring cleavage of residual acid anhydride radical, whereby resin having pyridine acid value of 98 and alcohol acid value of 93 was obtained.

100 parts of said resin was dissolved in 20 parts of butylcellosolve and the solution was dispersed in water by adding diethanol amine in 0.6 equivalent amount to the pyridine acid value of the resin, whereby varnish having solid concentration of 35 weight percent, varnish viscosity of 25 poise and pH value of 7.6 was obtained.

EXAMPLE 4

In the same flask as in Example 1 were placed 1100 parts of hydrogenated product of hydroxyl terminated butadiene polymer the same as in Example 3 and 96 parts of trimellitic acid anhydride and the mixture was heated at 140° C. for 1 hour in a nitrogen gas stream. To the resultant product cooled to 110° C. was added 1070 parts of maleic linseed oil obtained in the same manner as in Example 1 and the mixture was heated at 110° C. until viscosity of the mixture reached 4.5 to 5.0 stokes, whereby condensation product having pyridine acid value of 104 and alcohol acid value of 77 was obtained.

100 parts of the resultant product was heated at 120° C. for 2 hours with 20 parts of Cellosolve (ethyleneglycol monoethylether) for half-esterification, whereby 87 weight percent concentration solution of resin having pyridine acid value of 76 and alcohol acid value of 74 was obtained.

100 parts of the resultant resin solution was diluted with 9 parts of butyl Cellosolve and the resultant resin solution was dispersed in water by adding diethylamine in 0.7 equivalent amount to the pyridine acid value of the resin, whereby varnish having solid concentration of 35 weight percent, varnish viscosity of 30 poise and pH value of 8.1 was obtained.

EXAMPLE 5

In the same flask as in Example 1 were placed 878 parts of Chinese tung oil and 174 parts of fumaric acid and the mixture was heated at 180° C. for 3 hours, whereby 1050 parts of fumaric tung oil having pyridine acid value of 155 was obtained.

In a flask equipped with a stirrer, thermometer and water separating funnel were placed 2000 parts of hydroxyl terminated butadiene polymer having the following characteristics, 735 parts of fumaric tung oil obtained above, 168 parts of "Empol 1014" (trademark, polymerized fatty acid of 36 carbon atoms, Emery Industry, Inc., U.S.A.), 150 parts of toluene and 0.5 part of 4-methyl-2,6-di-t-butylphenol.

Characteristics of the hydroxyl terminated butadiene polymer used

Number average molecular weight ($M_n$) -------- 1980
$M_w/M_n$ ---------------------------------- 2.4
Hydroxyl value ------------------------------ 48
Content of—
  1,2-bond ----------------------percent-- 27.0
  1,4-trans bond -------------------do---- 55.2
  1,4-cis bond ---------------------do---- 17.8

The resultant mixture was heated at 170° C. until viscosity of the mixture reached 4.0 to 4.5 stokes, and then toluene was distilled off under reduced pressure, whereby condensation product having pyridine acid value of 35 was obtained.

100 parts of the resultant resin was dissolved in 30 parts of butyl Cellosolve, and the solution was dispersed in water by adding diethylamino ethanol in 1.0 equivalent amount to the acid value of the resin, whereby varnish having solid concentration of 35 weight percent, varnish viscosity of 90 poise and pH value of 8.3 was obtained.

EXAMPLE 6

4.4 parts of metallic sodium was dispersed in 300 parts of tetrahydrofuran and the dispersion was cooled to $-40°$ C. To the dispersion a cooled mixture of 80 parts of butadiene and 20 parts of styrene was added slowly at $-40°$ C. in 3 hours for polymerization. Then 10 parts of ethylene oxide was added dropwise with stirring to the resultant reaction mixture while raising the temperature of the system to room temperature. Then 200 parts of water was added with stirring to the mixture at room temperature and left to stand for 0.5 hour. The sodium hydroxide formed was separated from the lower layer and removal of the tetrahydrofuran and unreacted ethylene oxide gave hydroxyl terminated copolymer of butadiene and styrene having the following characteristics:

Number average molecular weight ($M_n$) _____ 1050
Hydroxyl value _____ 88
Content of—
   1,2-bond per polybutadiene chain __percent__ 68.5
   1,4-trans bond per polybutadiene chain _do____ 21.3
   1,4-cis bond per polybutadiene chain __do____ 10.2

In the same flask as in Example 5 were placed 1100 parts of hydroxyl terminated butadiene-styrene copolymer obtained above, 1050 parts of fumaric tung oil obtained in Example 5, 100 parts of toluene and 0.5 part of 4-methyl-2,6-di-t-butylphenol. The mixture was heated at 210° C. until the viscosity of the mixture reached 6.0 to 6.5 stokes, and then cooled and the toluene contained was distilled off under reduced pressure, whereby condensation product having pyridine acid value of 60 was obtained.

100 parts of the resultant resin was dissolved in 10 parts of diacetone alcohol and 10 parts of n-butanol and the solution was dispersed in water by adding diethyl amine in 0.8 equivalent amount to the pyridine acid value of the resin, whereby varnish having solid concentration of 35 weight percent, varnish viscosity of 55 poise and pH value of 8.2 was obtained.

EXAMPLE 7

In the same flask as in Example 1 were placed 1100 parts of the same hydroxyl terminated butadiene polymer as in Example 3 and 532 parts of dodecenyl succinic acid anhydride. The mixture was heated in a nitrogen gas stream at 110° C. until the viscosity of the mixture reached to 5.0 to 5.5 stokes, whereby condensation product of pyridine acid value of 79 and alcohol acid value of 73 was obtained. To the product cooled to 80° C. were added 4 parts of water and 1.5 parts of triethylamine, and maintained at 80° C. with stirring for 1 hour, whereby a resin of pyridine acid value of 79 and alcohol acid value of 75 was obtained.

100 parts of the resultant resin was dissolved in 15 parts of n-butanol and the solution was dispersed in water by adding triethylamine in 0.6 equivalent amount to the pyridine acid value of the resin, whereby varnish having solid concentration of 35 weight percent, varnish viscosity of 35 poise and pH value of 7.6 was obtained.

EXAMPLE 8

In the same flask as in Example 1 were placed 878 parts of linseed oil, 245 parts of maleic anhydride and 0.5 part of iodine and the mixture was heated at 200° C. for 6 hours, whereby 1120 parts of maleic linseed oil of pyridine acid value of 220 and alcohol acid value of 140 was obtained in a brown oily form.

In the same flask used in Example 1 were placed 120 parts of partly hydrogenated product (hydrogenation of 20%) of hydroxyl terminated butadiene polymer having the following characteristics and 336 parts of the maleic linseed oil obtained as above.

Characteristics of the polymer used

Number average molecular weight ($M_n$) _____ 1100
Hydroxyl value _____ 88
Content of 1,2-bond _____percent__ 91.0
Content of 1,4-trans bond _____do____ 9.0

The mixture was heated at 90° C. until the viscosity of the mixture reached 4.5 to 5.0 stokes, whereby condensation product of pyridine acid value of 150 and alcohol acid value of 92 was obtained. To the product cooled to 90° C. were added 19 parts of water and 0.5 part of triethylamine and maintained at 90° C. for 2 hours, whereby resin having pyridine acid value of 147 and alcohol acid value of 140 was obtained.

100 parts of the resultant resin was dissolved in 10 parts of 4-methoxy-4-methylpentanone-2 and the solution was dispersed in water by adding diethylamine in 0.6 equivalent amount to the pyridine acid value of the resin, whereby varnish having solid concentration of 35 weight percent, varnish viscosity of 20 poise and pH value of 7.5 was obtained.

571 parts of the respective varnishes obtained in Examples 1 to 8 were mixed with 200 parts of red iron oxide, 7 parts of strontium chromate and 142 parts of water. To the above mixture were respectively added the same bases for the preparation of the varnishes in respective examples to adjust the pH of the mixture to 8.2–8.5, and the mixture was kneaded in a pebble mill for 20 hours to thoroughly disperse the pigment. The resultant mixture was taken out of the mill and 2280 parts of the respective varnishes of Examples 1 to 8 was further added thereto and stirred for 2 hours to produce 8 kinds of paint compositions.

The paint compositions were respectively diluted with water to solid concentration of about 10 weight percent to prepare electrophoretic paints.

Electrophoretic deposition was carried out in the manner described below by applying each paint to a steel plate treated with zinc phosphate.

The paint characteristics, electrodeposition characteristics and the performance of the coated film were measured in accordance with the following methods. The results obtained are shown in the appended Table 1.

(1) Method of electrodeposition 4 liters of the paint was filled in a rectangular polyvinyl chloride resin container, 150 mm. x 200 mm. x 150 mm., provided with a parallel electrodes spaced apart in facing relationship with each other by a distance of 150 mm., a cathode being made of stainless steel sheet, 100 mm. x 150 mm. x 0.8 mm. and an anode being made of steel sheet treated with zinc phosphate of the same dimensions. The paint in the container was maintained at 30° C. and D.C. voltage was applied to the electrodes. During the operation the voltage was kept constant and after three minutes of the operation the current was turned off, and the anode was removed from the bath and was baked at 160° C. for 30 min. after washing with water.

(2) Characteristics (a) Solid content in electrophoretic paint.—2 g. of the sample paint was dried at 150° C. for 1 hour and the dried solid was measured. The solid content was represented in weight percent.

(b) pH of electrophoretic paint.—pH at 30° C. of the paint was evaluated with glass electrode pH measuring device.

(c) Electrodepositing voltage.—In the electrodeposition method specified in (1) above the voltage was measured when the thickness of the film deposited on the test piece reached 25 to 30μ.

(d) Thickness of film.—The resultant dried film was measured with a thickness gauge.

(e) Surface condition of the film.—Dried film was inspected with the naked eye for crawling, pinhole, rough surface, etc.

(f) Hardness.—Pencil scratching value was measured in accordance with JIS (Japanese Industrial Standard) K 5622.

(g) Impact resistance.—Dupont impact testing machine was used. Hammer 0.5 inch dia. with the loads of 500 g. and 1000 g. dropped from the respective heights onto the test piece, and the maximum height from which the hammer was dropped without creating cracks or peelings was measured. The concave side made by the impact is shown as the face and convex side as the back.

(h) Waterproofing property.—After 500 hours' immersion of the test piece in warm water at 40° C., one showing no blister or sinking in clouding on the film surface was represented as "good" in external appearance. After the test piece thus immersed was left at room temperature for 24 hours the impact resistance test in (g) above was applied to the piece and the maximum height which did not create cracks was sought.

(i) Resistance to salt water spray.—After spraying 5 weight percent aqueous solution of sodium chloride at 35° C. for 240 hours on the test piece according to JIS Z-2371, the widths of corrosion and blisters occurring in the cross-cuts were measured.

TABLE 2

| Paint (Ex. No.) | 1 | 2 |
|---|---|---|
| Solid content (wt. percent) | 10.1 | 10.0 |
| pH of bath comp. | 8.0 | 7.7 |
| Voltage (v.) | 140 | 150 |
| Film thickness (μ): | | |
| Front | 28 | 26 |
| Back | 28 | 26 |
| Condition of film surface | (1) | (1) |
| Pencil hardness | H | HB |
| Impact resistance (cm.) (baked at 160° C. for 30 min.): | | |
| Face (500 g.) | 50 | 50 |
| Back (500 g.) | 50 | 50 |
| Face (1 kg.) | 50 | 50 |
| Back (1 kg.) | 50 | 50 |
| Impact resistance (cm.) (baked at 180° C. for 30 min.): | | |
| Face (500 g.) | 50 | 50 |
| Back (500 g.) | 30 | 30 |
| Face (1 kg.) | 40 | 40 |
| Back (1 kg.) | 30 | 30 |
| Waterproof property: | | |
| Surface condition of film | (1) | (1) |
| Impact resistance (cm.): | | |
| Face (500 g.) | 50 | 50 |
| Back (500 g.) | 50 | 50 |
| Face (1 kg.) | 50 | 50 |
| Back (1 kg.) | 50 | 50 |
| Resistance to salt water spraying (mm.) | 2 | 3 |

[1] Good.

From the results of Table 2 above the paint compositions obtained from the varnishes of Examples 1 and 2 have been found to exhibit excellent electrodeposition characteristics, impact resistance, waterproofing property and resistance to salt water spraying.

TABLE 1

| Paint (Ex. No.) | 1 | 2 | 3 | 4 | 5 | 6 | 7 | 8 |
|---|---|---|---|---|---|---|---|---|
| Solid content of bath comp. (wt. percent) | 10.1 | 10.1 | 10.3 | 10.2 | 9.8 | 9.9 | 10.0 | 10.2 |
| pH of bath comp. | 8.0 | 7.8 | 7.6 | 8.2 | 8.2 | 8.1 | 7.7 | 7.6 |
| Voltage (v.) | 120 | 140 | 140 | 110 | 50 | 80 | 50 | 110 |
| Film thickness (μ): | | | | | | | | |
| Front | 27 | 27 | 29 | 26 | 27 | 28 | 25 | 27 |
| Back | 27 | 27 | 29 | 26 | 26 | 28 | 24 | 27 |
| Condition of film surface | (1) | (1) | (1) | (1) | (1) | (1) | (1) | (1) |
| Pencil hardness | F | B | HB | H | HB | HB | H | F |
| Impact resistance (cm.) (baking at 160° C. for 30 min.): | | | | | | | | |
| Face (500 g.) | 50 | 50 | 50 | 50 | 50 | 50 | 50 | 50 |
| Back (500 g.) | 50 | 50 | 50 | 50 | 50 | 50 | 50 | 50 |
| Face (1 kg.) | 50 | 50 | 50 | 50 | 50 | 50 | 50 | 50 |
| Back (1 kg.) | 50 | 50 | 50 | 50 | 50 | 50 | 50 | 50 |
| Impact resistance (cm.) (baking at 180° C. for 30 min.): | | | | | | | | |
| Face (500 g.) | 50 | 50 | 50 | 50 | 50 | 50 | 50 | 50 |
| Back (500 g.) | 30 | 30 | 40 | 40 | 30 | 30 | 30 | 40 |
| Face (1 kg.) | 40 | 40 | 50 | 50 | 40 | 40 | 40 | 50 |
| Back (1 kg.) | 20 | 30 | 40 | 40 | 20 | 30 | 30 | 40 |
| Waterproof property: | | | | | | | | |
| Appearance of film | (1) | (1) | (1) | (1) | (1) | (1) | (1) | (1) |
| Impact resistance (cm.): | | | | | | | | |
| Face (500 g.) | 50 | 50 | 50 | 50 | 50 | 50 | 50 | 50 |
| Back (500 g.) | 50 | 50 | 50 | 50 | 50 | 50 | 50 | 50 |
| Face (1 kg.) | 50 | 50 | 50 | 50 | 50 | 50 | 50 | 50 |
| Back (1 kg.) | 50 | 50 | 50 | 50 | 50 | 50 | 50 | 50 |
| Resistance to salt water spraying (mm.) | 2 | 3 | 2 | 3 | 3 | 3 | 3 | 3 |

[1] Good.

As evident from the results in Table 1 above, the respective electrodeposited films obtained from the respective paint compositions exhibited excellent electrodeposition characteristics, resistance to salt-water spraying and impact resistance, particularly in the case of excessive baking and in waterproofing test.

428 parts of the varnishes of Examples 1 and 2 were respectively mixed with 300 parts of titan white, 1 part of carbon black, 7 parts of strontium chromate and 184 parts of water. To the mixture were further added 2430 parts of the respective varnishes and 50 parts of water to thereby obtain paint composition of 39 weight percent solid content. Painting characteristics, electrodeposition characteristics of the respective compositions and the various performances of the film therefrom were measured in the similar manner to that of Table 1. The results are shown in Table 2.

715 parts of the varnish of Example 3 was mixed with 50 parts of carbon black and 115 parts of water and thoroughly kneaded to disperse the carbon black therein. Then 2135 parts of the varnish of Example 3 was further added thereto and mixed homogeneously for 2 hours. To the mixture was further added slowly with stirring 250 parts of 5 weight percent aqueous solution of ammonium chromate to produce a homogeneous paint composition of 32 weight percent solid content. Another paint composition was prepared from the varnish of Example 7 in the same manner as above.

The above paint compositions were also electrodeposited in the same manner as in Table 1, and electrodeposition characteristics and the various performances of the film obtained therefrom were measured with the results as shown in Table 3.

TABLE 3

| Paint comp. (Ex. No.) | 3 | 7 |
|---|---|---|
| Solid content (wt. percent) | 10.2 | 9.9 |
| pH of paint | 7.6 | 7.7 |
| Voltage (v.) | 110 | 60 |
| Film thickness (μ): | | |
| Front | 27 | 26 |
| Back | 27 | 26 |
| Surface condition of film | (1) | (1) |
| Pencil hardness | HB | H |
| Impact resistance (cm.) (baked at 160° C. for 30 min.): | | |
| Face (500 g.) | 50 | 50 |
| Back (500 g.) | 50 | 50 |
| Face (1 kg.) | 50 | 50 |
| Back (1 kg.) | 50 | 50 |
| Impact resistance (cm.) (baked at 180° C. for 30 min.): | | |
| Face (500 g.) | 50 | 50 |
| Back (500 g.) | 40 | 30 |
| Face (1 kg.) | 50 | 40 |
| Back (1 kg.) | 40 | 30 |
| Waterproof property: | | |
| Appearance of film | (1) | (1) |
| Impact resistance (cm.): | | |
| Face (500 g.) | 50 | 50 |
| Back (500 g.) | 50 | 50 |
| Face (1 kg.) | 50 | 50 |
| Back (1 kg.) | 50 | 50 |
| Resistance of salt water spraying (mm.) | 2 | 2 |

¹ Good.

In Table 3 above, the resistance to salt water spraying is shown by the result of 168 hours' spraying.

From the results of Table 3 it has been ascertained that the film obtained from paint compositions of the varnishes of Examples 3 and 7 respectively has extremely excellent impact resistance, waterproofing property and resistance to salt water spraying.

Varnish of solid content of 50 weight percent was prepared from the resin obtained in Example 1 by dissolving 100 parts of the resin in 30 parts of butyl Cellosolve and 20 parts of n-butanol and dispersing the solution in water by the addition of dimethylaminoethanol in 0.7 equivalent amount to the pyridine acid value of the resin.

400 parts of the above varnish was thoroughly kneaded with 600 parts of red iron oxide, 100 parts of talc, 50 parts of strontium chromate and 100 parts of water to disperse the pigments therein. To the mixture was further added 1600 parts of the above varnish and 650 parts of water and stirred for 2 hours, whereby a paint composition containing 50 weight percent solids was obtained. Said paint composition was diluted with water to such a viscosity of 30 to 40 sec. in terms of Ford Cup #4 viscosity at 25° C. to produce the paint for immersion painting.

In the resultant paint was dipped at 30° C. a steel sheet, 100 mm. x 150 mm. x 0.8 mm. treated with zinc phosphate, and was taken out of the bath and left to stand for 15 min. Thereafter it was baked at 160° C. for 30 min., and the resultant film was measured for various performances by the method of Table 1 with the results as shown in Table 4.

TABLE 4

| | |
|---|---|
| Viscosity of paint (sec.) | 35 |
| Solid content (wt. percent) | 36 |
| pH of paint | 8.0 |
| Film thickness (μ) | 24 |
| Condition of film surface | (1) |
| Pencil hardness | HB |
| Impact resistance (cm.) (baking at 160° C. for 30 min.): | |
| Face (500 g.) | 50 |
| Back (500 g.) | 50 |
| Face (1 kg.) | 50 |
| Back (1 kg.) | 50 |
| Impact resistance (cm.) (baking at 180° C. for 30 min.): | |
| Face (500 g.) | 50 |
| Back (500 g.) | 30 |
| Face (1 kg.) | 40 |
| Back (1 kg.) | 20 |
| Waterproof property: | |
| Appearance of film | (1) |
| Impact resistance (cm.): | |
| Face (500 g.) | 50 |
| Back (500 g.) | 50 |
| Face (1 kg.) | 50 |
| Back (1 kg.) | 50 |
| Resistance to salt water spraying (mm.) | 3 |

¹ Good.

In Table 4 above the viscosity of the paint by Ford Cup #4 at 25° C. is shown.

From the results of Table 4 it has been found that the paint compositions for immersion painting according to the invention exhibit extremely excellent painted surface condition, impact resistance, water-proofing property and resistance to salt water spraying.

What we claim is:

1. An aqueous coating composition which comprises an aqueous medium and a modified diene polymer neutralized with a base and dispersed in the aqueous medium; said modified diene polymer being a condensation product having a pyridine acid value of 30 to 200 of
   (a) a hydroxyl terminated polymer of an aliphatic conjugated diene of 4 to 8 carbon atoms, said hydroxyl terminated polymer having at least one hydroxyl group bonded at the end of the polymeric chain and a number average molecular weight of 200 to 10,000 and
   (b) at least one of polybasic acids or anhydrides thereof having 8 to 26 carbon atoms in the carbon-carbon skeletal chain thereof.

2. The aqueous coating composition according to claim 1, in which said hydroxyl terminated diene polymer is a hydroxyl terminated butadiene polymer.

3. The aqueous coating composition according to claim 2, in which said hydroxyl terminated butadiene polymer is of more than 90% of 1,2 addition content and has a ratio of weight average molecular weight to number average molecular weight of less than 2.

4. The aqueous coating composition according to claim 2, in which said hydroxyl terminated butadiene polymer is a hydroxyl terminated butadiene homopolymer.

5. The aqueous coating composition according to claim 1, in which said hydroxyl terminated diene polymer has a number average molecular weight of 800 to 5,000.

6. The aqueous coating composition according to claim 1, in which said polybasic acid is an addition product of an α,β-ethylenically unsaturated dibasic acid or an anhydride with a vegetable oil fatty acid or with an ester thereof.

7. The aqueous coating composition according to claim 1, in which said polybasic acid is at least one member selected from the group consisting of maleinized vegetable oil, maleinized vegetable oil fatty acid, fumarinized vegetable oil, fumarinized vegetable oil fatty acid, dodecenyl succinic acid anhydride and nonenyl succinic acid anhydride.

8. The coating composition according to claim 7 in which said polybasic acid is at least one member selected from the group consisting of maleinized vegetable oil fatty acid and fumarized vegetable oil fatty acid.

9. The aqueous coating composition according to claim 1, in which said condensation product has a pyridine acid value of 50 to 150.

10. The aqueous coating composition according to claim 1, in which said condensation product contains acid anhydride radical and is modified with a compound having active hydrogen atom.

11. The aqueous coating composition according to claim 10, in which said compound having active hydrogen atom is a monohydric alcohol.

12. The aqueous coating composition according to claim 10, in which said compound having active hydrogen atom is a primary amine, secondary amine or ammonia.

13. The aqueous coating composition according to claim 10, in which said compound having active hydrogen atom is water.

14. The aqueous coating composition according to claim 1, in which said modified diene polymer is a condensation product of
    (a) a hydroxyl terminated polymer of an aliphatic conjugated diene of 4 to 8 carbon atoms, said hydroxyl terminated polymer having at least one hydroxyl group bonded at the end of the polymeric chain and a number average molecular weight of 200 to 10,000, (b) at least one of polybasic acid or anhydride thereof having 8 to 26 carbon atoms in the carbon-carbon skeletal chain thereof and (c) a lower molecular weight polybasic acid anhydride selected from the group consisting of phthalic anhydride, maleic anhydride, tetrahydrophthalic anhydride, hexahydrophthalic anhydride, 5 - bicyclo-[2,2,1]-heptene-2,3-dicarboxylic acid or anhydride thereof and trimellitic acid anhydride, said lower molecular weight polybasic acid anhydride being used in not higher than 1:1 carboxyl group ratio to the polybasic acid or anhydride (b).

15. The aqueous coating composition according to claim 1, in which said composition further contains pigment.

References Cited
UNITED STATES PATENTS

| | | | |
|---|---|---|---|
| 3,609,111 | 9/1971 | Kumanotani | 260—78.4 X |
| 3,518,213 | 6/1970 | Miyosli et al. | 260—22 |
| 2,863,784 | 12/1958 | Hillyer | 106—252 |
| 3,365,411 | 1/1968 | Mertzweiller et al. | 260—29.7 |
| 3,366,563 | 1/1968 | Hart et al. | 204—181 |

DONALD E. CZAJA, Primary Examiner

D. J. BARRACK, Assistant Examiner

U.S. Cl. X.R.

106—243, 244, 252, 287 R; 204—181; 260—29.7 R, 29.7 AT, 29.7 H, 41.5 R, 41.5 A, 78.4 D